Nov. 7, 1944.    G. L. CHERRY ET AL    2,362,048
MOLDING PRESS
Filed April 7, 1943    3 Sheets-Sheet 1

INVENTORS:
G. L. CHERRY
J. R. JOHNSON
W. J. SCOTT
BY Harry L. Duff
ATTORNEY

Nov. 7, 1944. G. L. CHERRY ET AL 2,362,048
MOLDING PRESS
Filed April 7, 1943  3 Sheets-Sheet 2

INVENTORS:
G. L. CHERRY
J. R. JOHNSON
W. J. SCOTT
BY Harry L. Duft
ATTORNEY

Nov. 7, 1944.  G. L. CHERRY ET AL  2,362,048
MOLDING PRESS
Filed April 7, 1943  3 Sheets-Sheet 3

INVENTORS:
G. L. CHERRY
J. R. JOHNSON
W. J. SCOTT
BY Harry L. Duft
ATTORNEY

Patented Nov. 7, 1944

2,362,048

UNITED STATES PATENT OFFICE 2,362,048

MOLDING PRESS

George L. Cherry, Western Springs, Joel R. Johnson, Chicago, and Walter J. Scott, Hinsdale, Ill., assignors to Western Electric Company, Incorporated, New York, N. Y., a corporation of New York Application April 7, 1943, Serial No. 482,082

7 Claims. (Cl. 25—84)

This invention relates to molding presses and more particularly to presses for molding ceramic parts before they are fired.

It is an object of the present invention to provide a simple molding apparatus from which molded parts may be readily removed.

In accordance with one embodiment of the invention as applied to an apparatus for molding ceramic insulator rings, a mold is provided comprising a fixed cylindrical portion into which there extends a central core member and in which a base is movable. The base member cooperates with a movable die to compress a body of ceramic material in the mold and may then be moved to eject the mold part under manual control, automatic means being provided for directing a jet of air to blow the molded part off of the movable base member of the mold and a second jet of air being directed upwardly to clear the movable die of the mold. The upper or movable die of the mold is actuated by any suitable hydraulic driving mechanism and the jet of air is automatically turned off and on by the movement of the ram of the driving mechanism.

A better understanding of the invention will be had by reference to the following detailed description when considered in conjunction with the accompanying drawings, wherein Fig. 1 is a front elevational view of a molding press embodying the present invention, parts being broken away to conserve space and a portion of the apparatus adjacent to the mold cavity being broken away to show the mold cavity in section;

Figure 1:
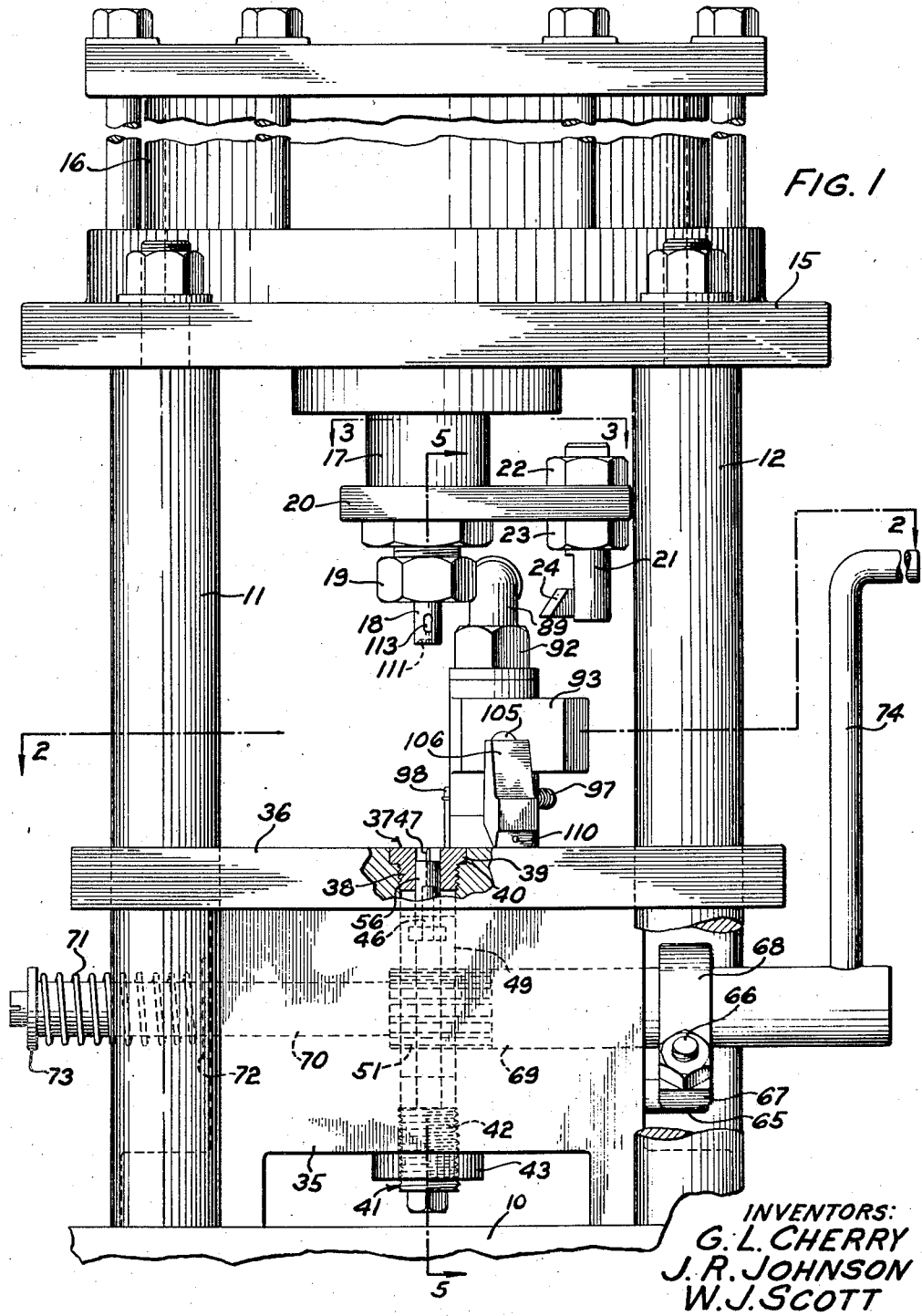
Figure 3:
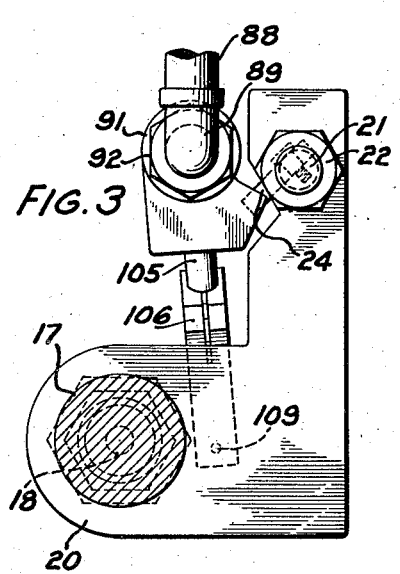
Fig. 3 is a fragmentary horizontal sectional view taken substantially along the line 3—3 of Fig. 1 in the direction of the arrows, showing a portion of the means for directing a blast of air onto the molded part in elevation.
Figure 6:
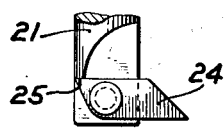
Fig. 6 is a fragmentary detail view of a portion of the mechanism which actuates the means for directing a jet of air to effect the ejection of a molded part from the apparatus.

Referring to the drawings, wherein like reference characters designate the same parts throughout the several views, particular reference being first had to Fig. 1, it will be seen that the molding apparatus is mounted upon a base 10 having extending upwardly from it a plurality of standards 11, 12, 13 and 14 for supporting a cross head 15. The cross head 15, in turn, supports a cylinder 16, in which a piston rod 17 may be reciprocated by a piston (not shown). The piston rod 17 has adjustably mounted at its lower end an upper molding die 18, which is suitably fixed to the piston rod 17 by means of a clamping nut 19. In addition to supporting the molding die 18, the piston rod 17 carries an actuator plate 20, on which there is mounted a stud 21, the stud being fixed to the actuator plate by means of retainer nuts 22 and 23. Pivoted on the stud 21, as shown most clearly in Figs. 3 and 6, is a cam member 24, which normally rests in the position shown in Fig. 6, where its upper surface engages an abutment surface 25 formed on the stud 21, whereby the camming member 24 is normally held against movement out of the position shown in Fig. 6. The operation of this part will become apparent as this description progresses.

Figure 5:
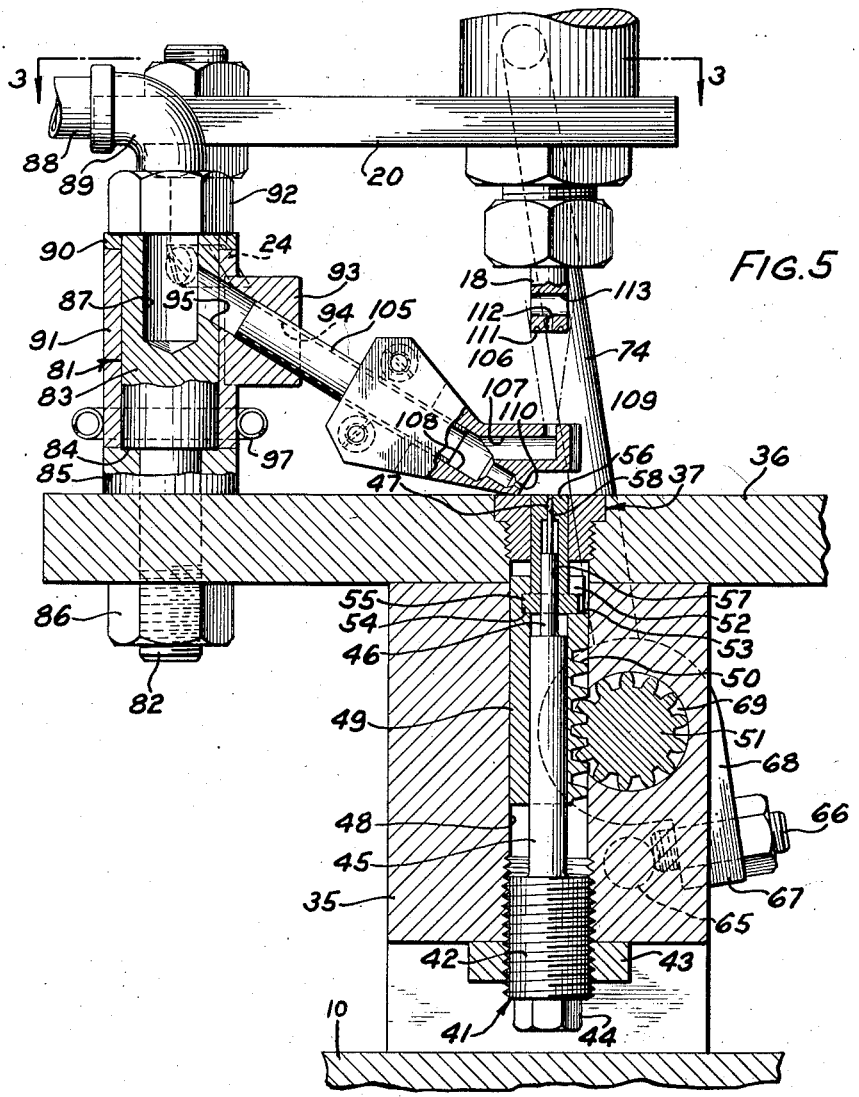
Fig. 5 is a fragmentary vertical sectional view on an enlarged scale taken substantially along the line 5—5 of Fig. 1 in the direction of the arrows, showing the lower portion of the molding die in its upper position and showing the ejecting mechanism partially in section.

Mounted on the base member 10 is a support block 35, which supports a plate 36 through which the standards 11, 12, 13 and 14 extend and in which a fixed molding die 37 is mounted. The molding die 37 comprises an annular shank portion 38 threaded into the plate 36 and having an annular shoulder portion 39 resting on a cooperating shoulder 40 formed in the plate 36. The support block 35, as shown most clearly in Fig. 5, has threaded in it a core support 41. The core support 41 is provided with a threaded portion 42, which may be threaded into the supporting block 35 and locked in place therein by means of a lock nut 43, the core support being provided with a head 44 for adjusting its position vertically. In addition to the threaded portion 42, the core support includes a reduced portion 45 and a further reduced shank 46, with which there is integrally formed the core 47.

The supporting block 35 has an aperture 48 formed in it into which the threaded portion 42 of the core support is threaded and in which there is slidable a sleeve 49. The sleeve 49 has teeth 50 cut into it for cooperation with a gear 51 and the sleeve 49 is freely slidable within the aperture 48 and around the reduced portion 45 of the core support 41. A portion of the sleeve 49 adjacent its upper end is cut away, as shown at 52, to form a shoulder 53 in alignment with the lower surface of a notch 54, in which a shoulder 55 of a lower movable die 56 may rest. With this construction, the lower movable die 56, having coaxial central apertures 57 and 58, together with the sleeve 49, may be placed in the position shown in Fig. 5 prior to the positioning of the core support 41 and fixed molding die 37 in the apparatus and, thereafter, the fixed molding die 37 and the core support may be placed in the apparatus where the lower movable die 56 will encircle and engage the shank 46 and core 47 and will be slidable with respect to the fixed molding die and core support.

Figure 2:
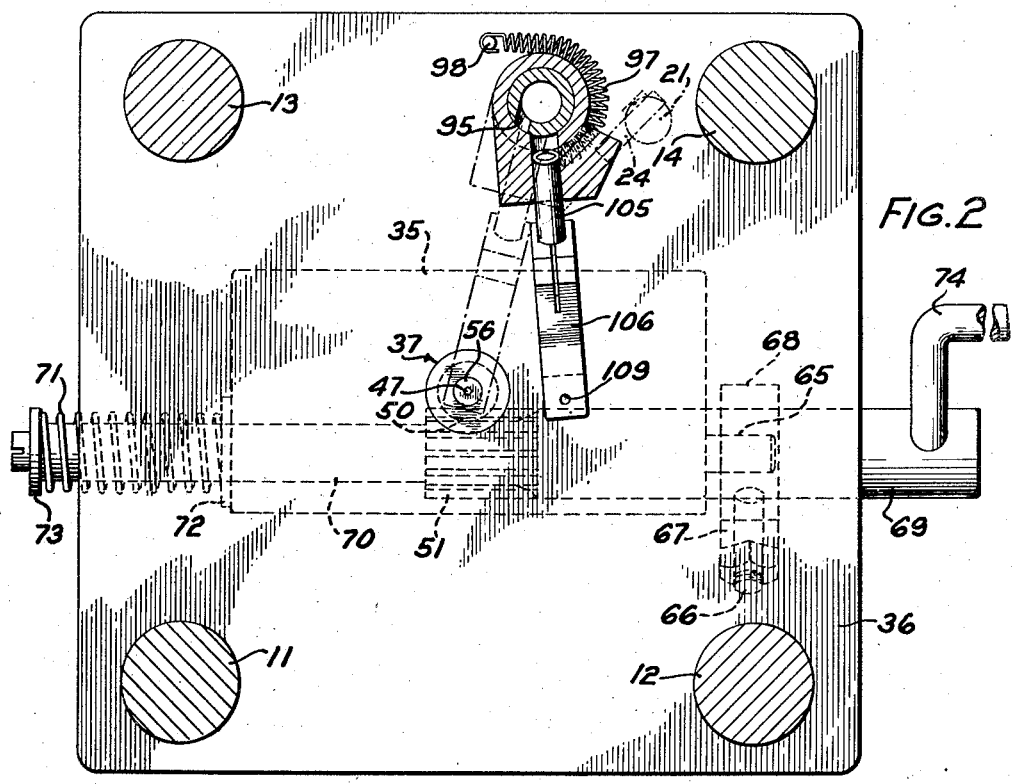
Fig. 2 is a horizontal sectional view taken substantially along the line 2—2 of Fig. 1 in the direction of the arrows showing a portion of the means for directing the blast of air to effect the ejection of the molded part from the base of the mold.

The supporting block 35 has a pin 65 extending outwardly from it to serve as an abutment for engaging a threaded abutment member 66, which is threaded into an extension 67 formed on a ring 68, which is fixed to a shaft 69 on which the gear 51 is formed. The shaft 69 has a reduced portion 70 which extends to the left end of the supporting block 35 (Fig. 1) and has its extending end encircled by a compression spring 71 which bears against a washer 72 engaging the left side (Figs. 1 and 2) of the supporting block 35 and is compressed between the washer 72 and a shouldered machine screw 73 threaded into the left end of the reduced portion 70 of the shaft. In this manner, the shaft 69 will tend to remain in any position to which it is rocked by means of a handle 74 suitably attached to it.

Mounted upon the plate 36 is a stationary valve member 81 comprising a threaded shank 82 and an enlarged cylindrical portion 83. A shoulder 84 formed at the juncture of the shank 82 and enlarged cylindrical portion 83 engages a collar 85 and the shank 82 has a threaded member 86 threaded onto it to hold the valve member 81 in place on the plate 36. The upper end of the cylindrical portion 83 is hollowed out, as shown at 87, and the hollow interior of the valve member is supplied with a fluid under pressure directed thereto through a pipe 88 connected to a source of fluid under pressure and an elbow 89. Adjacent its upper end, the cylindrical portion 83 of the valve member 81 has a collar 90 surrounding it and between the collar 90 and the collar 85 there is provided a sleeve 91, which surrounds the cylindrical portion 83 and may be rotated thereabout, the assembly of the sleeve 91 and collar 90 being held on the cylindrical portion 83 of the valve member 81 by a lock nut 92. The sleeve 91 has a shoulder 93 formed on it through which there extends an aperture 94, which may be moved into alignment with a cooperating aperture 95 in the cylindrical portion 83 of the valve member 81 when the sleeve is rotated from the position shown in full lines in Fig. 2 to the position shown in dot and dash lines in that figure. The sleeve 91 is, however, normally urged to the position shown in full lines in Fig. 2 by a contractile spring 97 attached to it and to a pin 98 mounted upon the plate 36. The shoulder 93 is normally urged by the spring 97 to lie in the path of the cam member 24 and when the cam member 24 is moved downwardly with the actuator plate 20, the cam member 24 will be tilted about its pivot pin and will be ineffective to move the sleeve 91. However, when the actuator plate 20 is moved upwardly, the cam member 24 will engage the undersurface of the shoulder 93 and will rotate the sleeve 91 from the position shown in full lines in Fig. 2 to the position shown in dot and dash lines, thereby to bring the aperture 94 in the sleeve 91 into alignment with the aperture 95 in the cylindrical portion of the stationary valve member 81, thus to permit air under pressure to pass from the interior of the stationary valve member 81 through the aligned apertures 95 and 94.

Figure 4:
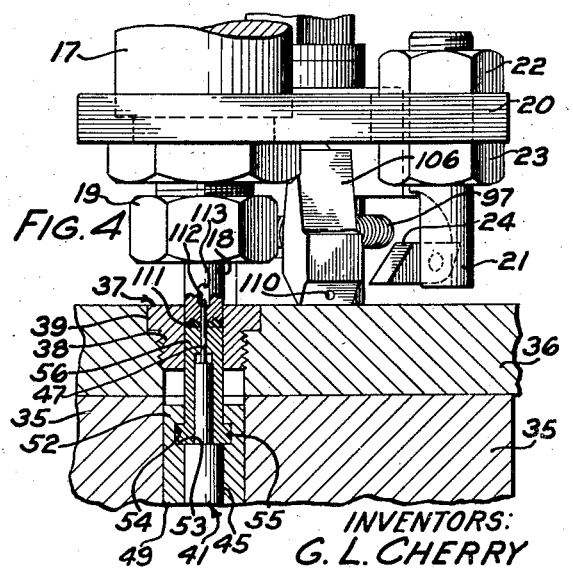
Fig. 4 is a fragmentary sectional view through the mold cavity showing the upper molding die in its actuated position.

There is set into the aperture 94 a tubular member 105, onto the lower end of which there is suitably secured an irregularly shaped block or nozzle 106 having passageways 107 and 108 in communication with the tubular member 105. The passages 107 and 108 terminate in ports 109 and 110, which serve to direct jets of air under pressure upwardly against the lower face of the upper molding die 18 and across the upper surface of the plate 36 and lower movable die 56 when the movable die is in its upper position. In this manner, the upper movable die will be cleaned and the part lying on the upper surface of the lower movable die will be ejected therefrom. It should be noted that when the lower movable die is moved upwardly by manipulating the handle 74, the molded part will be stripped off of the core 47 and the jet of air directed from the port 110 will be strong enough to blow the part off of the upper surface of the lower movable die 56. It should also be noted that the upper movable die 18, as is shown most clearly in Figs. 4 and 5, has an annular groove 111 formed in its undersurface and has an aperture 112 adapted to receive the core 47 and extending into a cross aperture 113. It is from these surfaces that the jet of air blown through the port 109 will clear any loose fragments of material which might have adhered thereto during the molding operation.

A better understanding of the apparatus will be had from the following brief description of the operation thereof. After a charge of material has been placed in the cavity formed by the fixed molding die 37 and lower movable molding die 56 while the lower movable molding die is in the position shown in Fig. 1, fluid under pressure may be admitted to the cylinder 16 in any suitable manner to move the piston rod 17 downwardly, thereby to compact the ceramic material between the upper and lower movable molding dies, the fixed molding die and the core 47. After the article being formed in the apparatus has thus been molded, the operator may move the handle 74 clockwise to the position shown in Fig. 5. At the same time that the handle 74 is urged clockwise, the piston 17 may be moved upwardly by admitting fluid under pressure to the lower end of the cylinder 16. As the piston rod 17 moves upwardly, it will carry the movable die member 18 and the actuator plate 20 upwardly with it and, furthermore, will permit the operator to move the lower movable molding die 56 upwardly to the position shown in Fig. 5 through the action of the gear 51 and the movable sleeve 49. Just shortly after the lower movable molding die 56 reaches the position shown in Fig. 5, the cam member 24 will become effective to cam the sleeve 91 around to a position where the aperture 94 therein is in alignment with the aperture 95 in the stationary valve member 81 and a blast of air will be directed across the face of the plate 36 and movable molding die 56 from the port 110 simultaneously with the blast of air directed out of the port 109 against the lower face of the molding die 18.

What is claimed is:

1. In a molding apparatus, movable and stationary molding dies, means for directing a blast of air to clean the movable die, means for normally holding said blast directing means in an inoperative position, and a cam member movable with the movable die for moving said blast directing means to operative position.

2. In a molding apparatus, movable and stationary molding dies, means for directing a blast of air to clean the movable die, means for normally holding said blast directing means in an inoperative position, and a cam member movable with the movable die for moving said blast directing means to operative position, said means for directing a blast of air including a rotatable sleeve, a cylinder for rotatably supporting the sleeve, and passages in the cylinder and sleeve movable into communication one with another upon movement of the blast directing means to operative position.

3. A molding apparatus for insulators comprising a stationary molding member, a stationary core member, a lower movable molding member, an upper movable molding member, means for moving the lower movable molding member to strip a molded part from the core and stationary molding member, a nozzle member having a pair of outlet ports and normally positioned out of the path of the movable molding members, means movable with the upper movable molding member for moving the nozzle member momentarily into the path of movement of the movable molding member, and means for supplying air under pressure to the nozzle to clean the molding members.

4. A molding apparatus for insulators comprising a stationary molding member, a stationary core member, a lower movable molding member, an upper movable molding member, means for moving the lower movable molding member to strip a molded part from the core and stationary molding member, a nozzle member having a pair of outlet ports and normally positioned out of the path of the movable molding members, means movable with the upper movable molding member for moving the nozzle member momentarily into the path of movement of the movable molding member, an oscillatable valve member, means interconnecting said valve member and the nozzle, a stationary valve member having a port therein normally closed by said oscillatable valve member, and means for supplying air under pressure to said port in the stationary valve member for direction through the nozzle.

5. A molding apparatus for insulators comprising a stationary molding member, a stationary core member, a lower movable molding member, an upper movable molding member, means for moving the lower movable molding member to strip a molded part from the core and stationary molding member, a nozzle member having a pair of outlet ports and normally positioned out of the path of the movable molding member, means movable with the upper movable molding member for moving the nozzle member momentarily into the path of movement of the movable molding member, an oscillatable valve member, means interconnecting said valve member and the nozzle, a stationary valve member having a port therein normally closed by said oscillatable valve member, means for supplying air under pressure to said stationary valve member, and a passage in said stationary valve member for directing air through the oscillatable valve member when the nozzle and oscillatable valve member are moved.

6. A molding apparatus for insulators comprising a stationary molding member, a stationary core member, a lower movable molding member, an upper movable molding member, means for moving the lower movable molding member to strip a molded part from the core and stationary molding member, a nozzle member having a pair of outlet ports and normally positioned out of the path of the movable molding members, a displaceable cam member movable with the upper movable molding member for moving the nozzle member momentarily into the path of movement of the movable molding member, and means for directing a blast of air under pressure through the nozzle member while it is in the path of movement of the movable molding member.

7. A molding apparatus for insulators comprising a stationary molding member, a stationary core member, a lower movable molding member, an upper movable molding member, means for moving the lower movable molding member to strip a molded part from the core and stationary molding member, a nozzle member having a pair of outlet ports and normally positioned out of the path of the movable molding members, means for supplying air under pressure to said nozzle member when it is out of normal position, a supporting stud movable with the upper movable molding member, a cam member pivoted on said supporting stud in position to engage the nozzle member each time the upper movable molding member is moved, and an abutment shoulder for engaging said cam member and preventing movement thereof about its pivot when the supporting stud moves in one direction whereby the cam member will move the nozzle.

GEORGE L. CHERRY.
JOEL R. JOHNSON.
WALTER J. SCOTT.